United States Patent
Jacob et al.

(10) Patent No.: US 11,131,686 B2
(45) Date of Patent: Sep. 28, 2021

(54) PROCESS FOR MANUFACTURING A PITOT TUBE HAVING A GRAPHITE INSERT EMBEDDED THEREIN

(71) Applicant: ROSEMOUNT AEROSPACE INC, Burnsville, MN (US)

(72) Inventors: Robin Jacob, Bangalore (IN); Guru Prasad Mahapatra, Karnataka (IN)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 278 days.

(21) Appl. No.: 16/374,228

(22) Filed: Apr. 3, 2019

(65) Prior Publication Data

US 2020/0249251 A1     Aug. 6, 2020

(30) Foreign Application Priority Data

Feb. 1, 2019   (IN) .............................. 201911004024

(51) Int. Cl.
 *G01P 5/165*   (2006.01)
 *B23K 26/40*   (2014.01)
 *G01F 1/46*   (2006.01)

(52) U.S. Cl.
 CPC .............. *G01P 5/165* (2013.01); *B23K 26/40* (2013.01); *G01F 1/46* (2013.01)

(58) Field of Classification Search
 CPC ....... G01P 5/165; B23K 26/40; B23K 26/342; B23K 26/21; B23K 26/14; B23K 26/34; G01F 1/46; B22F 5/106; B22F 2998/10; B22F 3/1055; B23P 15/00; B33Y 80/00
 See application file for complete search history.

(56) References Cited

U.S. PATENT DOCUMENTS

| | | | |
|---|---|---|---|
| 6,892,584 B2 * | 5/2005 | Gilkison | G01P 5/165 73/1.29 |
| 8,124,245 B2 | 2/2012 | Budinger et al. | |
| 9,719,820 B1 * | 8/2017 | Jacob | G01F 1/46 |
| 9,758,876 B2 | 9/2017 | Shorey et al. | |

(Continued)

FOREIGN PATENT DOCUMENTS

| | | |
|---|---|---|
| EP | 3009847 A1 | 4/2016 |
| EP | 3048408 A1 | 7/2016 |

(Continued)

OTHER PUBLICATIONS

European Search Report, European Patent Office, Application No. 19196766.0, dated Feb. 12, 2020 (7 pp.).

(Continued)

*Primary Examiner* — Rick K Chang
(74) *Attorney, Agent, or Firm* — Cantor Colburn LLP

(57) ABSTRACT

Disclosed is a process of manufacturing a pitot tube assembly including: obtaining a metal cylindrical tube having a first axial portion that is a first material blank for an assembly inlet portion of the pitot tube assembly and a second axial portion that is a second material blank for a body portion of the pitot tube assembly; nesting the first axial portion of the tube within a cylindrical graphite insert; nesting the cylindrical graphite insert within a cylindrical sheath; constraining axial motion of the insert; performing laser scanning to the assembly inlet portion; and performing additive manufacturing to the pitot tube assembly inlet portion.

20 Claims, 4 Drawing Sheets

(56) References Cited

U.S. PATENT DOCUMENTS

| | | | |
|---|---|---|---|
| 10,640,860 B2* | 5/2020 | Jacob | B23K 26/0006 |
| 2009/0047439 A1* | 2/2009 | Withers | B22F 10/20 |
| | | | 427/448 |
| 2017/0219397 A1 | 8/2017 | Jacob et al. | |
| 2018/0099358 A1 | 4/2018 | Hart et al. | |
| 2018/0112938 A1* | 4/2018 | Mahapatra | B22D 23/00 |
| 2018/0143049 A1 | 5/2018 | Gordon et al. | |
| 2018/0356438 A1* | 12/2018 | Jacob | B22C 9/04 |
| 2020/0087769 A1* | 3/2020 | Jacob | B23K 26/1476 |
| 2020/0109982 A1* | 4/2020 | Jacob | G01P 5/165 |

FOREIGN PATENT DOCUMENTS

| | | |
|---|---|---|
| EP | 3076185 A1 | 10/2016 |
| EP | 3133403 A1 | 2/2017 |
| EP | 3190419 A1 | 7/2017 |
| EP | 3199955 A1 | 8/2017 |
| EP | 3413059 A1 | 12/2018 |
| FR | 2329511 A1 | 5/1977 |
| FR | 3042065 A1 | 4/2017 |

OTHER PUBLICATIONS

European Search Report, European Patent Office, Application No. 19211310.8-1017, dated Feb. 12, 2020 (9 pp.).

* cited by examiner

PROCESS FOR MANUFACTURING A PITOT TUBE HAVING A GRAPHITE INSERT EMBEDDED THEREIN

CROSS REFERENCE TO RELATED APPLICATIONS

This application claims the benefit of an earlier filing date from Indian Patent Application Serial No. 201911004024 filed Feb. 1, 2019, the entire disclosure of which is incorporated herein by reference.

BACKGROUND

The embodiments herein relate to a pitot tube and more specifically to a process for manufacturing a pitot tube having a graphite insert embedded therein.

Air data probes are mounted external to the aircraft. This requires the probes to be aerodynamically efficient with adequate structural strength, and heating performance to avoid icing. Manufacturing of such probes, however, may provide challenges resulting in probes that structurally weak and/or are subject to ice build-up that impedes performance.

BRIEF DESCRIPTION

Disclosed is a process of manufacturing a pitot tube assembly including: obtaining a metal cylindrical rodtube having a first n axial upstream portion that is a first material blank for an assembly inlet portion of the pitot tube assembly and a second axial portion that is a second material blank for a body portion of the pitot tube assembly; nesting the first axial upstream portion of the rodtube within a cylindrical graphite insert; nesting the cylindrical graphite insert within a cylindrical sheath; constraining axial motion of the insert; performing laser scanning to the assembly inlet portion; and performing additive manufacturing laser metal deposition (LMD) to the pitot tube assembly inlet portion. In addition to one or more of the above disclosed features and steps, or as an alternate, the tube is nickel or a nickel alloy and the insert is pyrolytic or annealed pyrolytic graphite (APG).

In addition to one or more of the above disclosed features and steps, or as an alternate, the process comprises performing hot iso-static processing (HIPping) or heat treating of the assembly after performing laser metal deposition.

In addition to one or more of the above disclosed features and steps, or as an alternate, the process comprises securing the assembly with a rotary chuck when performing additive manufacturing or preforming additive manufacturing with a multi-axis machine.

In addition to one or more of the above disclosed features and steps, or as an alternate, nesting the first axial portion of the tube within the insert includes providing a transition fit therebetween.

In addition to one or more of the above disclosed features and steps, or as an alternate, nesting the insert within the sheath includes providing a transition fit therebetween.

In addition to one or more of the above disclosed features and steps, or as an alternate, constraining axial motion of the insert includes positioning the insert and the sheath axially against an annular platform defined by a stepwise transition between a first diameter for the first axial portion of the tube and a second diameter for the second axial portion of the tube, the second diameter being larger than the first diameter.

In addition to one or more of the above disclosed features and steps, or as an alternate, constraining axial motion of the insert includes mounting an endcap to the assembly to axially engage the insert and the sheath.

In addition to one or more of the above disclosed features and steps, or as an alternate, mounting the endcap includes positioning an annular rim portion of the endcap against the sheath and positioning a boss of the endcap within an axial cavity formed by nesting the insert within the sheath, and wherein the boss axially engages the insert.

In addition to one or more of the above disclosed features and steps, or as an alternate, positioning the boss within the cylindrical cavity includes providing a transition fit between the boss and the sheath.

In addition to one or more of the above disclosed features and steps, or as an alternate, the process includes machining the assembly, which includes machining the assembly inlet portion and the assembly body portion.

In addition to one or more of the above disclosed features and steps, or as an alternate, machining the assembly inlet portion includes forming a passage inlet portion of an axial passage, and machining the assembly body portion includes forming a passage body portion of the axial passage.

In addition to one or more of the above disclosed features and steps, or as an alternate, forming the passage inlet portion includes forming a first passage inlet portion and a second passage inlet portion, wherein the first passage inlet portion is upstream of the second passage inlet portion, wherein an axial transition between the first passage inlet portion and the second passage inlet portion is along an axial span of the insert.

In addition to one or more of the above disclosed features and steps, or as an alternate, forming the first passage inlet portion includes forming a first profile that converges from a first diameter at an first axial end of the assembly to second diameter at the axial transition between the first passage inlet portion and the second passage inlet portion.

In addition to one or more of the above disclosed features and steps, or as an alternate, forming the second passage inlet portion includes forming a cylindrical profile having a diameter that is the same as the second diameter.

In addition to one or more of the above disclosed features and steps, or as an alternate, forming the passage body portion includes forming a cylindrical profile having a diameter that is larger than the second diameter, and forming a stepwise transition between the second passage inlet portion and the passage body portion.

In addition to one or more of the above disclosed features and steps, or as an alternate, machining the assembly further includes forming a second profile to an outer surface of the assembly extending over the assembly inlet portion and the assembly body portion, the second profile diverging from a third diameter at the first axial end of the assembly to a fourth diameter at an axial location at or proximate to a second axial end of the assembly.

In addition to one or more of the above disclosed features and steps, or as an alternate, machining the assembly further includes forming a mounting portion the outer surface of the assembly, axially along the assembly body portion, wherein the mounting portion extends upstream from the second axial end of the assembly.

In addition to one or more of the above disclosed features and steps, or as an alternate, forming the mounting portion includes forming a cylindrical profile having a diameter that is smaller than the fourth diameter and forming a stepwise transition between the second profile of the outer surface and the cylindrical profile of the outer surface to thereby form an annular mounting platform.

In addition to one or more of the above disclosed features and steps, or as an alternate, machining the assembly further includes forming one or more drain holes in the assembly body portion.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and process are presented herein by way of exemplification and not limitation with reference to the Figures.

Figure 1:
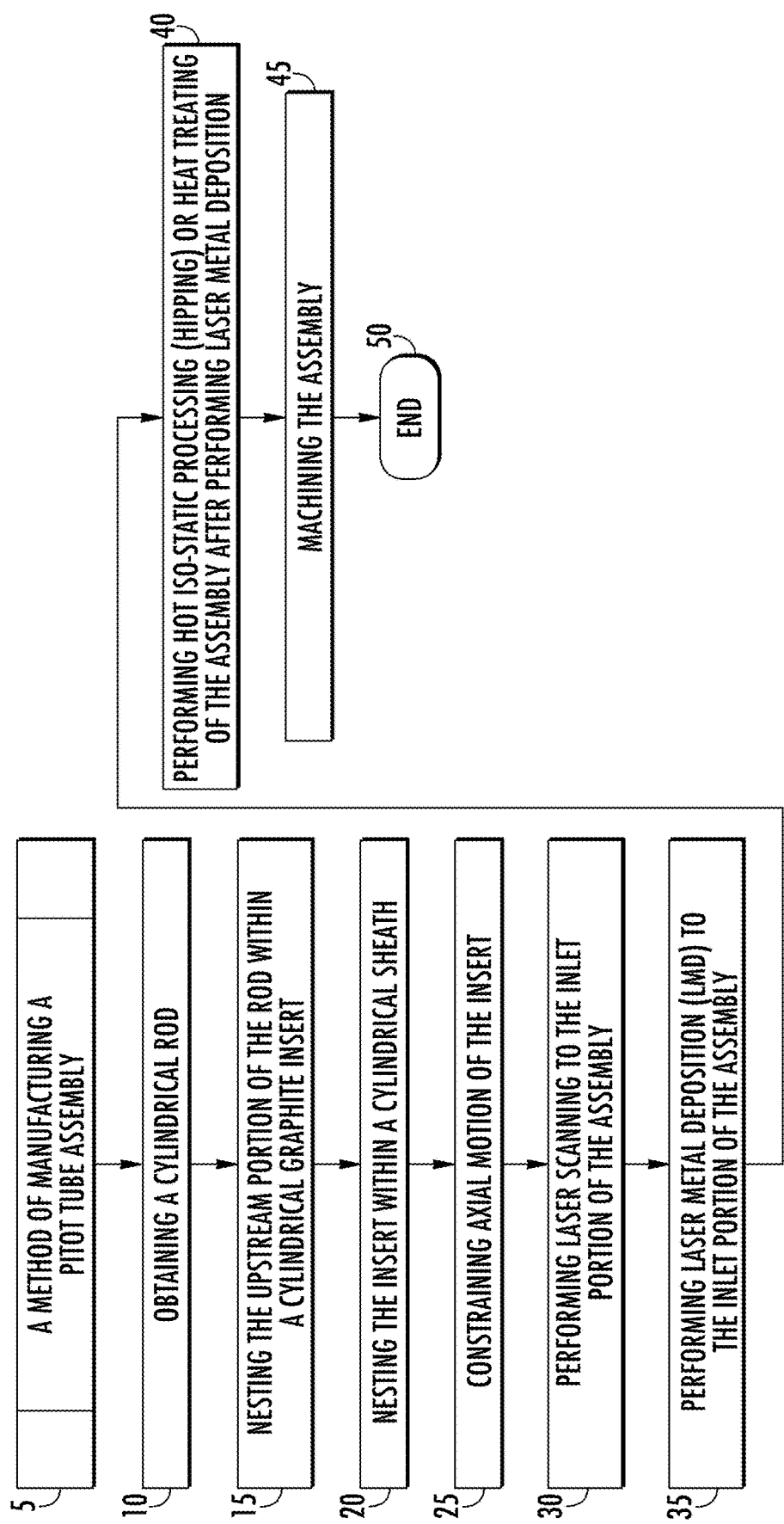
FIG. 1 depicts a flowchart for a process for manufacturing a pitot tube having a graphite insert embedded therein according to a disclosed embodiment.

Turning to FIG. 1 disclosed is a process illustrated as a flowchart having blocks representing process steps. The blocks are sequentially numbered for furtherance of this disclosure. The steps identified in the respective blocks need not be performed in the illustrated order unless expressly identified herein.

Figure 2:
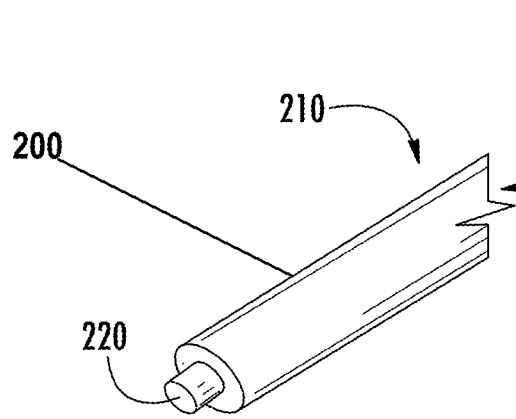
FIG. 2 illustrates a cylindrical tube utilized in the process according to a disclosed embodiment.
Figure 8:
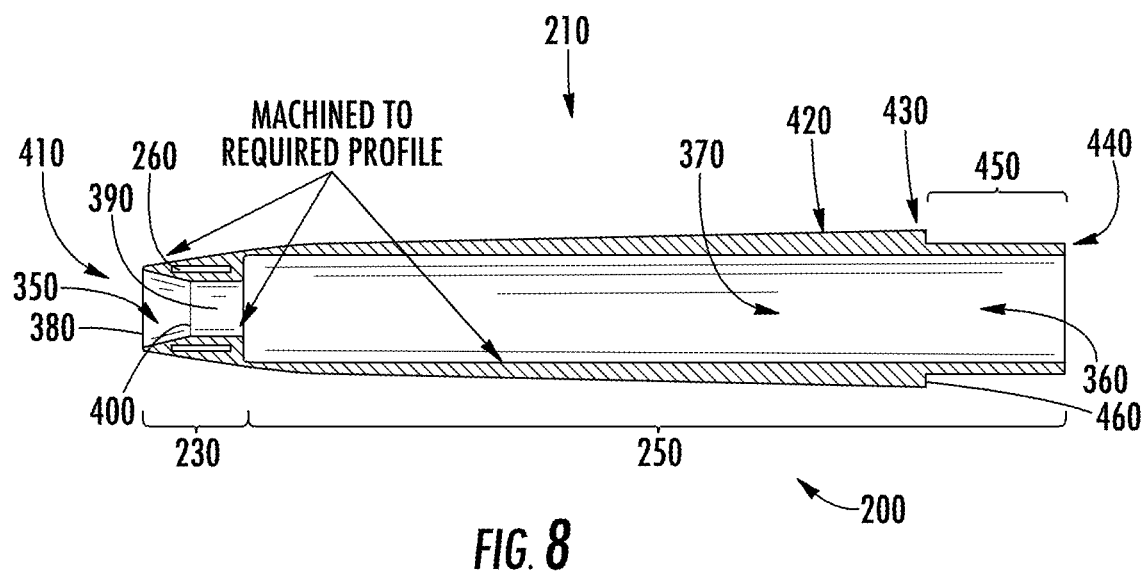
FIG. 8 illustrates a machined pitot static tube according to a disclosed embodiment.

With continued reference to FIG. 1, block 5 includes a process of manufacturing a pitot tube assembly 200 (FIG. 8). The process includes block 10 of obtaining a cylindrical tube 210 (a rod is within the scope of the disclosure), an example of which is in FIG. 2. The tube 210 may be nickel or a nickel alloy. The tube 210 has an axial upstream portion 220 which is a first portion of the tube 210 and is a first material blank for an assembly inlet portion 230 (FIG. 8) and an axial downstream portion 240 that is a second portion of the tube 210 and is a second material blank for an assembly body portion 250 (FIG. 8).

Figure 3:
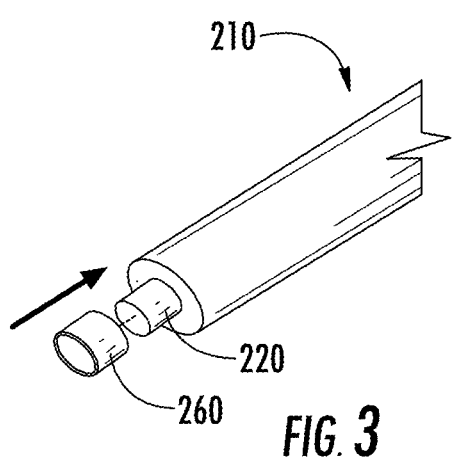
FIG. 3 illustrates a graphite insert being nested over the tube according to a disclosed embodiment.

As further illustrated in FIG. 1, the process includes block 15 of nesting the upstream portion 220 of the tube 210 within a cylindrical graphite insert 260, an example of such nesting is in FIG. 3. The insert 260 may be pyrolytic or annealed pyrolytic graphite (APG). In one embodiment nesting the upstream portion of the tube 210 within the insert 260 includes providing a transition fit therebetween. Certain benefits of including a graphite insert in a pitot tube assembly are identified in U.S. Pat. No. 9,719,820 for a Hybrid Pitot Tube, granted on Aug. 1, 2017 to Rosemount et al, the entire disclosure of which is incorporated herein by reference.

Figure 4:
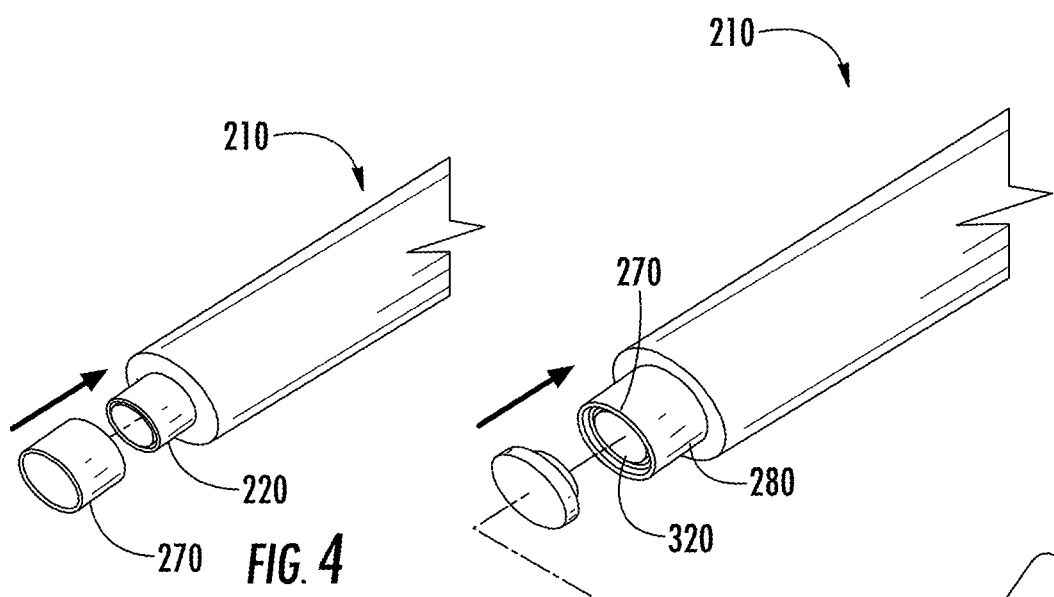
FIG. 4 illustrates a sheath being nested over the insert according to a disclosed embodiment.

As illustrated in FIG. 1, the process includes block 20 of nesting the insert 260 within a cylindrical sheath 270, an example of such nesting is in FIG. 4. In one embodiment nesting the insert 260 within the sheath 270 includes providing a transition fit therebetween. The sheath 270 may be selected which is a same material as the tube 210 (for example, nickel alloy). A thickness of the sheath 270 may be calculated based on a melt pool thickness required for a laser power in the LMD process specific to insert, discussed in further detail below.

Figure 6:
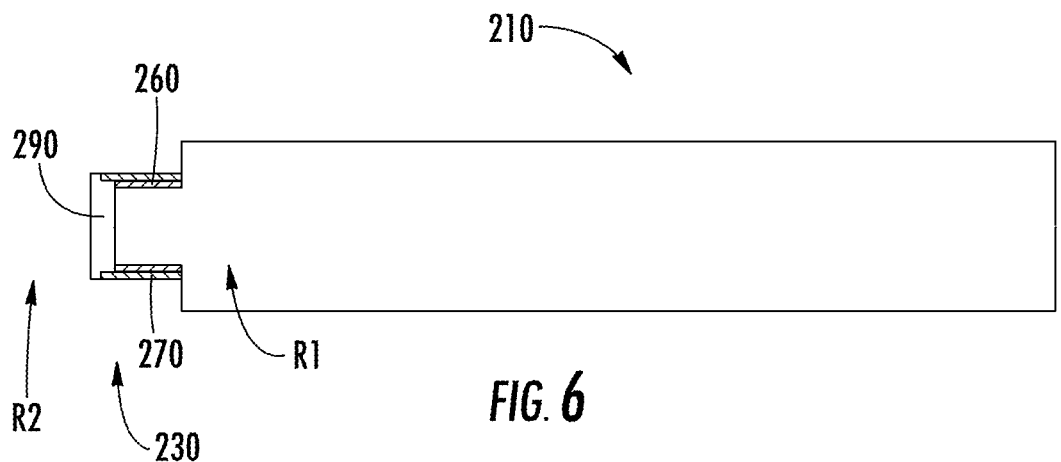
FIG. 6 illustrates the assembly following a laser scanning process according to a disclosed embodiment.

As illustrated in FIG. 1, the process includes block 25 of constraining axial motion of the insert 260. In one embodiment, as illustrated in FIG. 6, constraining axial motion of the insert 260 includes positioning the insert 260 and the sheath 270 axially against an annular platform 280. The platform 280 is defined by a stepwise transition between a first diameter for the upstream portion 220 of the tube 210 and a second diameter for the downstream portion 240 of the tube 210. The second diameter is larger than the first diameter.

Figure 5:
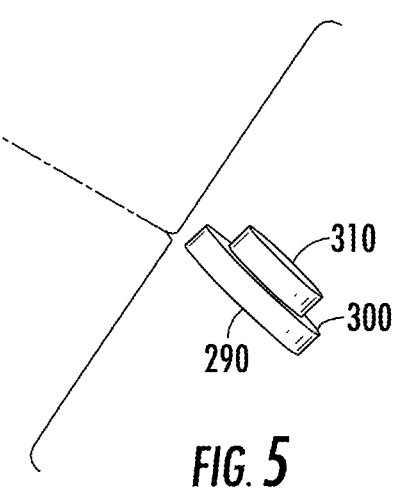
FIG. 5 illustrates an endcap being mounted to the sheath according to a disclosed embodiment.

In one embodiment constraining axial motion of the insert 260 further includes mounting an endcap 290 (FIG. 5) to the assembly 200 to axially engage the insert 260 and the sheath 270. In one embodiment mounting the endcap 290 includes positioning an annular rim portion 300 of the endcap 290 against the sheath 270. In addition, a cylindrical boss 310 of the endcap 290 is positioned within an axial cavity 320 formed by nesting the insert 260 in the sheath 270. With this configuration the boss 310 axially engages the insert 260. In one embodiment, positioning the boss 310 within the cylindrical cavity 320 includes providing a transition fit between the boss 310 and the sheath 270. As illustrated, the cavity 320 is provided because the insert 260 has a same axial length as the upstream portion 220 of the tube 210, and the sheath 270 is axially longer than the insert 260. In addition, the endcap 290, having the rim 300 and the boss 310, is a stepped endcap.

As illustrated in FIG. 1, the process includes block 30 of performing laser scanning to the assembly inlet portion 230. As illustrated in FIG. 6, laser scanning may start in regions marked R1 and R2 respectively at downstream and upstream sides of the assembly inlet portion 230. Scanning may be performed in region R1 initially to create a weld joint between the sheath 270 and the tube 210. Scanning such locations before scanning axially between such locations may avoid the creation of a void between the insert 260 and the tube 210 due to melting and filling an interface therebetween with molten metal. If required, any trapped air also may be removed by performing the laser scan in vacuum. Thereafter region 2 may be scanned and melted to constrain the insert 260 from expanding axially, which prevents the generation of axial pressure against the endcap 290. Scanning may then be performed axially between regions R1 and R2 to melt the metal the sheath 270 and enable localized contact between the sheath 270 and the insert 260.

Figure 7:
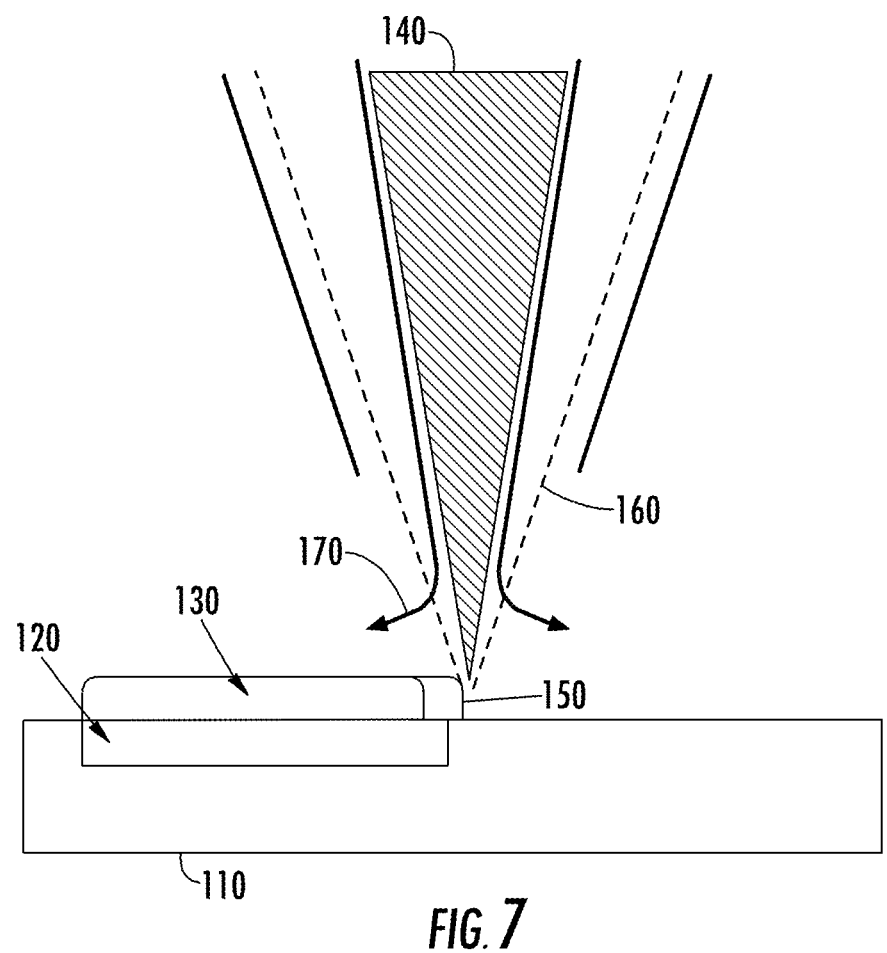
FIG. 7 illustrates generally a lased metal disposition process utilized by the disclosed embodiments.

As illustrated in FIG. 1, the process includes block 35 of performing laser metal deposition (LMD) to the assembly inlet portion 230. In FIG. 7, in general, an LMD process is illustrated, where the LMD process includes creating a melt pool 150 of metal on a workpiece or substrate 110 (for example, the graphite insert 260) using a laser beam 140. Under the LMD process, to create the melt pool 150, a stream of metal powder 160 is directed toward a deposition zone 130, that is, at an intersection of the laser beam 140 and the workpiece 110. A stream of inert gas 170 may be provided to surround the laser beam 140. The inert gas stream shields and protects the deposited material from oxidation.

At the deposition zone 130, the melt pool 150 fuses with the workpiece 110 to form a fusion zone 120. Under the LMD process, an outer sheath (for example, the sheath 270) acts as interface for laser metal deposition of the melt pool 150 onto the workpiece 110. With the LMD process, the graphite substrate workpiece 110 may be prepared in advance with or without metal plating. Such metal plating may include metals, such as nickel or chromium, to prevent oxidation and to get a metal coating that enables a bonding while performing the remaining operations of the laser direct metal deposition process.

The technical effects and benefits of an LMD process may include minimized annealed pyrolytic graphite oxidation due to coated/electroplated annealed pyrolytic graphite surface during laser direct metal deposition process; substantially continuous or full surface to surface contact between graphite substrate and encapsulate material with complex shapes; and relatively high thermal conductivity of the hybrid structure (with the annealed pyrolytic graphite). A heating treatment process may also be applied to improve the structural properties of metal.

In one embodiment the process includes block 40 of performing hot iso-static processing (HIPping) or heat treating of the assembly 200 after performing laser metal deposition. That is, the assembly may be verified for proper interface contacts by X-ray or similar scanning techniques and HIPping may be performed to remove voids and further compact the interfaces around the insert 260. Heat-treatment may be performed for stress relieving or modification of structural properties. In one embodiment the process includes securing the assembly with a rotary chuck when performing LMD or preforming LMD with a multi-axis LMD machine, and more specifically with a 5-axis LMD machine.

As illustrated in FIG. 1, in one embodiment the process includes block 45 machining the assembly 200. Machining the assembly 200 includes machining the assembly inlet portion 230 and the assembly body portion 250. As illustrated in FIG. 8, in one embodiment, machining the assembly inlet portion 230 includes forming a passage inlet portion 350 of an axial passage 360. Machining the assembly body portion 250 may include forming a passage body portion 370 of the axial passage 360.

In one embodiment, forming the passage inlet portion includes forming a first passage inlet portion 380 and a second passage inlet portion 390. The first passage inlet portion 380 is upstream of the second passage inlet portion 390. An axial transition 400 between the first passage inlet portion 380 and the second passage inlet portion 390 may be along an axial span of the insert 260.

In one embodiment, forming the first passage inlet portion 380 includes forming a first profile, which may be frustoconical. The first profile may converge from a first diameter at an upstream end 410 of the assembly 200, which is a first axial end of the assembly, to a second diameter at the axial transition 400 between the first passage inlet portion 380 and the second passage inlet portion 390. In one embodiment, forming the second passage inlet portion 390 includes forming a cylindrical profile having a diameter that is the same as the second diameter. In one embodiment, forming the passage body portion 370 includes forming a cylindrical profile having a diameter that is larger than the second diameter. In addition, a stepwise transition may be formed between the second passage inlet portion 390 and the passage body portion 370.

In one embodiment, machining the assembly further includes forming a second profile to an outer surface 420 of the assembly 200. The second profile may extend over the assembly inlet portion 230 and the assembly body portion 250. Inlet portion 230 outer surface may have a curve shape which may be straight or a profile that is aerodynamically suitable and/or which may be partially frustoconical. The second profile may diverge from a third diameter at the upstream end 410 of the assembly 200 to a fourth diameter at an axial location 430 that is at or proximate to a downstream end 440 of the assembly 200, which is a second axial end of the assembly.

In one embodiment, machining the assembly further includes forming a mounting portion 450 on the outer surface 420 of the assembly 200, axially within the assembly body portion 250. The mounting portion 420 extends upstream from the downstream end 440 of the assembly 200. In one embodiment, forming the mounting portion 450 includes forming a cylindrical profile having a diameter that is smaller than the fourth diameter. A stepwise transition may be formed between the second profile and the cylindrical profile on the outer surface 420 to thereby form an annular mounting platform 460.

Figure 9:
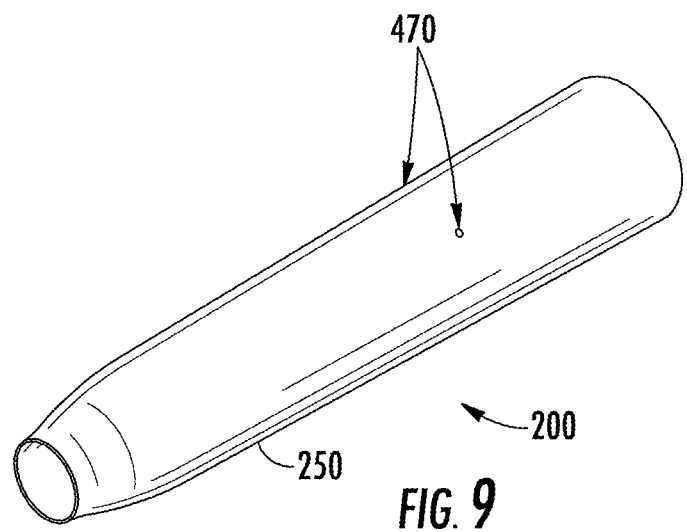
FIG. 9 illustrates a pitot static tube with drain holes according to a disclosed embodiment.

Turning to FIG. 9, in one embodiment, machining the assembly 200 further includes forming one or more drain holes 470 in the assembly body portion 250. The drain holes 470 may be provided, for example, by drilling. Once the pitot tube assembly 200 is machined to a final shape, the process that started at block 5 may end at block 50.

The technical effects and benefits of the one or more embodiments disclosed herein may include obtaining a hybrid material pitot tube design using a laser metal deposition process that: utilizes a stepped tube for mounting a graphite part and constrains thermal expansion in the inner diameter of the graphite part; utilizes a sheath to create melt pool against the graphite part and constrains thermal expansion of the outside diameter of the sheath; utilizes an endcap to encapsulate the graphite part and constrain axial expansion of the graphite part. The process also utilizes material deposition of metal over a graphite substrate by using LMD at the outside region of the pitot inlet. In addition, the process utilizes a cylindrical tube to form a majority of the structure of the pitot tube, which may: eliminate an additional tube housing manufacture by an additional LMD process and, therefore, reduce cost; and enable the use of heat treatments to the tube before adding the APG inset, to thereby reduce the potential effect of excessive heat treatments to the APG insert.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A process of manufacturing a pitot tube assembly comprising:
    obtaining a cylindrical tube having a first axial portion that is a first material blank for an assembly inlet portion of the pitot tube assembly and a second axial portion that is a second material blank for a body portion of the pitot tube assembly;
    nesting the first axial portion of the cylindrical tube within a cylindrical graphite insert;
    nesting the cylindrical graphite insert within a cylindrical sheath;
    constraining axial motion of the cylindrical graphite insert;
    performing laser scanning to the assembly inlet portion; and
    performing additive manufacturing to the assembly inlet portion.

2. The process of claim 1, wherein the tube is nickel or a nickel alloy and the insert is pyrolytic or annealed pyrolytic graphite (APG).

3. The process of claim 1, comprising performing hot iso-static processing (HIPping) or heat treating of the assembly after performing the additive manufacturing.

4. The process of claim 1, comprising securing the assembly with a rotary chuck when performing the additive manufacturing, or preforming the additive manufacturing with a multi-axis machine.

5. The process of claim 1, wherein nesting the first axial portion of the tube within the insert includes providing a transition fit therebetween.

6. The process of claim 5, wherein nesting the insert within the sheath includes providing a transition fit therebetween.

7. The process of claim 6, wherein constraining axial motion of the insert includes positioning the insert and the sheath axially against an annular platform defined by a stepwise transition between a first diameter for the first axial portion of the tube and a second diameter for the second axial portion of the tube, the second diameter being larger than the first diameter.

8. The process of claim 7, wherein constraining axial motion of the insert includes mounting an endcap to the assembly to axially engage the insert and the sheath.

9. The process of claim 8, wherein mounting the endcap includes positioning an annular rim portion of the endcap against the sheath and positioning a boss of the endcap within an axial cavity formed by nesting the insert within the sheath, and wherein the boss axially engages the insert.

10. The process of claim 9, wherein positioning the boss includes providing a transition fit between the boss and the sheath.

11. The process of claim 10, comprising machining the assembly, which includes machining the assembly inlet portion and the body portion.

12. The process of claim 11, wherein machining the assembly inlet portion includes forming a passage inlet portion of an axial passage, and machining the body portion includes forming a passage body portion of the axial passage.

13. The process of claim 12, wherein forming the passage inlet portion includes forming a first passage inlet portion and a second passage inlet portion, wherein the first passage inlet portion is upstream of the second passage inlet portion, wherein an axial transition between the first passage inlet portion and the second passage inlet portion is along an axial span of the insert.

14. The process of claim 13, wherein forming the first passage inlet portion includes forming a first profile that converges from a first diameter at an first axial end of the assembly to second dimeter at the axial transition between the first passage inlet portion and the second passage inlet portion.

15. The process of claim 14, wherein forming the second passage inlet portion includes forming a cylindrical profile having a diameter that is the same as the second diameter.

16. The process of claim 15, wherein forming the passage body portion includes forming a cylindrical profile having a diameter that is larger than the second diameter, and forming a stepwise transition between the second passage inlet portion and the passage body portion.

17. The process of claim 16, wherein machining the assembly further includes forming a second profile to an outer surface of the assembly extending over the assembly inlet portion and the assembly body portion, the second profile diverging from a third diameter at the first axial end of the assembly to a fourth diameter at an axial location at or proximate to a second axial end of the assembly.

18. The process of claim 17, wherein machining the assembly further includes forming a mounting portion the outer surface of the assembly, axially along the assembly body portion, wherein the mounting portion extends upstream from the second axial end of the assembly.

19. The process of claim 18, wherein forming the mounting portion includes forming a cylindrical profile having a diameter that is smaller than the fourth diameter and forming a stepwise transition between the second profile of the outer surface and the cylindrical profile of the outer surface to thereby form an annular mounting platform.

20. The process of claim 19, wherein machining the assembly further includes forming one or more drain holes in the assembly body portion.

\* \* \* \* \*